United States Patent
Chen

(10) Patent No.: US 6,494,112 B2
(45) Date of Patent: Dec. 17, 2002

(54) GEAR SHIFTER ON HANDLEBAR FOR OPERATING BICYCLE DERAILLEUR MECHANISM

(76) Inventor: Po-Cheng Chen, No. 66, Sec. 4, Chung-Ching N. Road, Taipei (TW)

(*) Notice: Subject to any disclaimer, the term of this patent is extended or adjusted under 35 U.S.C. 154(b) by 35 days.

(21) Appl. No.: 09/866,408

(22) Filed: May 25, 2001

(65) Prior Publication Data

US 2002/0078781 A1 Jun. 27, 2002

(30) Foreign Application Priority Data

Dec. 27, 2000 (TW) .................................. 089222546

(51) Int. Cl.[7] ............................................. F16C 1/12
(52) U.S. Cl. ................................................. 74/501.6
(58) Field of Search ........................... 74/500.5, 501.6, 74/502.2, 473.13–473.15, 473.3

(56) References Cited

U.S. PATENT DOCUMENTS

| | | | | |
|---|---|---|---|---|
| 5,241,877 A | * | 9/1993 | Chen ........................ | 74/502.2 |
| 5,458,018 A | * | 10/1995 | Kawakami ................ | 74/500.5 |
| 5,476,019 A | * | 12/1995 | Cheever et al. .......... | 74/502.2 |
| 5,540,304 A | * | 7/1996 | Hawkins et al. .......... | 74/501.6 |
| 5,566,790 A | * | 10/1996 | Chen ........................ | 74/502.2 |
| 5,588,925 A | * | 12/1996 | Arbeiter et al. .......... | 74/502.2 |
| 5,676,020 A | * | 10/1997 | Jordan et al. ............. | 74/502.2 |
| 6,182,524 B1 | * | 2/2001 | Nagashima ............... | 74/501.6 |
| 6,196,082 B1 | * | 3/2001 | Iwata ........................ | 74/501.6 |

* cited by examiner

Primary Examiner—Chong H. Kim
(74) Attorney, Agent, or Firm—Ostrolenk, Faber, Gerb & Soffen, LLP

(57) ABSTRACT

A handlebar gear shifter includes a sleeve rotatably mounted to the handlebar from which a support plate extends. An L-shaped mediate member has an end pivotally connected on the support plate and a first cable has one end thereof engaged with a recess in the sleeve and the other end of the first cable is engaged with the mediate member. A second cable is connected between the mediate member and a derailleur mechanism. A C-shaped member having notches is connected to the handlebar and a spring member is engaged with the sleeve. An index member is biased by the spring member and removably engaged with one of the notches. The mediate member is pivoted by rotating the sleeve which pulls the first cable, and the second cable is pulled together with the mediate member to shift the gear.

4 Claims, 6 Drawing Sheets

GEAR SHIFTER ON HANDLEBAR FOR OPERATING BICYCLE DERAILLEUR MECHANISM

FIELD OF THE INVENTION

The present invention relates to a gear shifter on a handlebar for pulling or releasing a derailleur cable of a bicycle derailleur mechanism of bicycle.

BACKGROUND OF THE INVENTION

A conventional gear shifting device generally is connected on the handle assembly and located between two handlebars. A derailleur cable extends from the gear shifting device and is connected to a derailleur mechanism so that when the derailleur cable is pulled, the position of the chain and the gears is changed. However, the user has to remove his/her hand from the handlebar to the shifting device, and the removal of the hand could result in unstable for controlling the bicycle. Besides, the user usually watches the operation of the gear shifting device during pulling the derailleur cable so as to make sure what gear is actually engaged with the chain. This removes the eyes of the user from the road and is dangerous for road safety.

The present invention intends to provide a gear shifter on handlebar and the derailleur cable is pulled or released simply by rotating the handlebar.

SUMMARY OF THE INVENTION

In accordance with one aspect of the present invention, there is provided a handlebar gear shifter and comprises a tubular handlebar having a support plate extending from an end of the handlebar. A sleeve is rotatably mounted to the handlebar and a recess is defined in an end of the sleeve. A mediate member has an end pivotally connected on the support plate. A first cable has one end thereof engaged with the recess and the other end of the first cable is engaged with the mediate member. A second cable has an end thereof connected to the mediate member and the other end of the second cable is connected to a derailleur mechanism. A C-shaped member having notches is connected to the handlebar. A spring member is engaged with the sleeve and an index member is biased by the spring member. The index member is removably engaged with one of the notches.

The primary object of the present invention is to provide a gear shifter on the handlebar and which pulls the derailleur cable by rotating the shifter.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
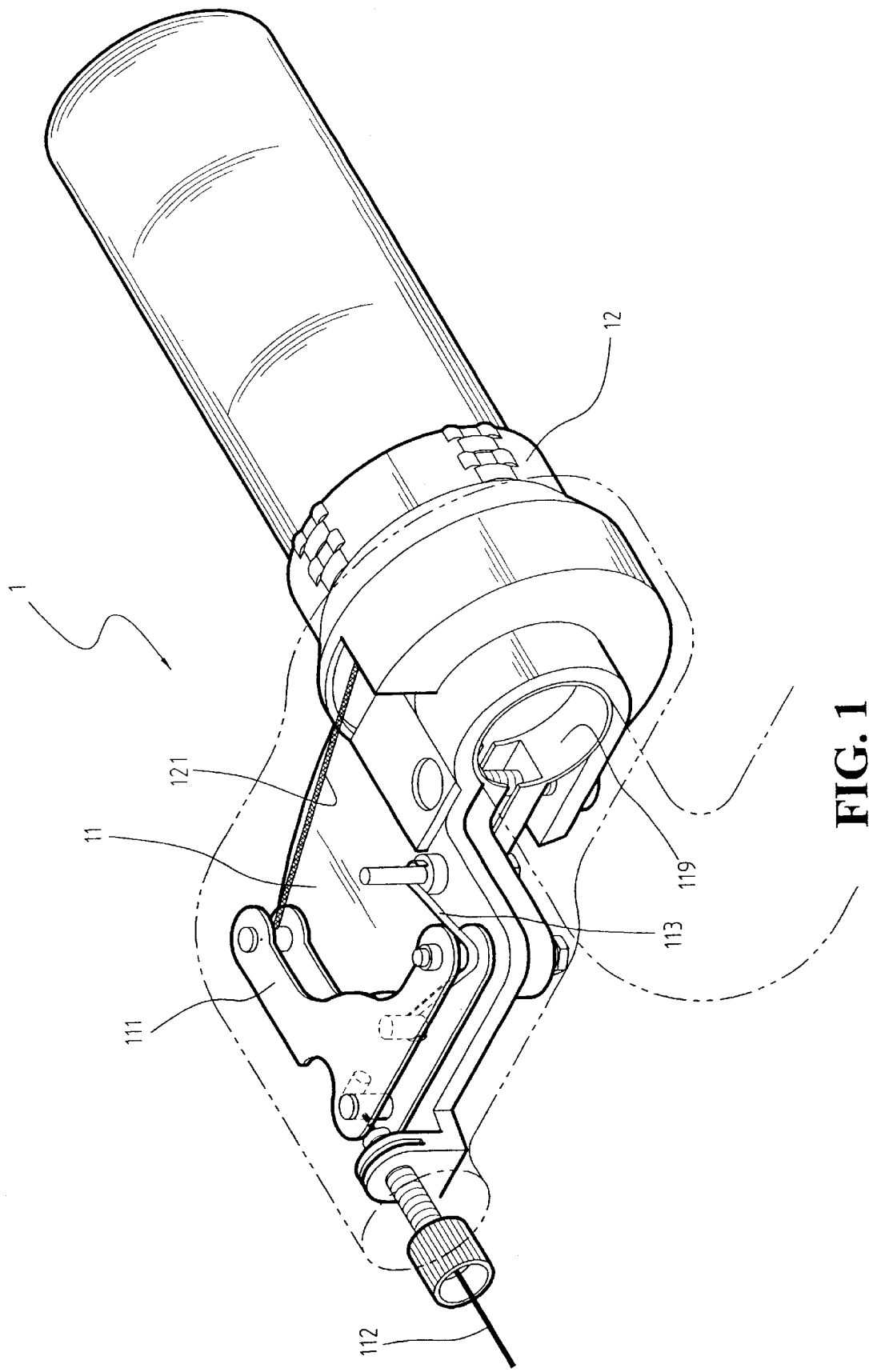
FIG. 1 is a perspective view to show the gear shifter on handlebar of the present invention.
Figure 2:
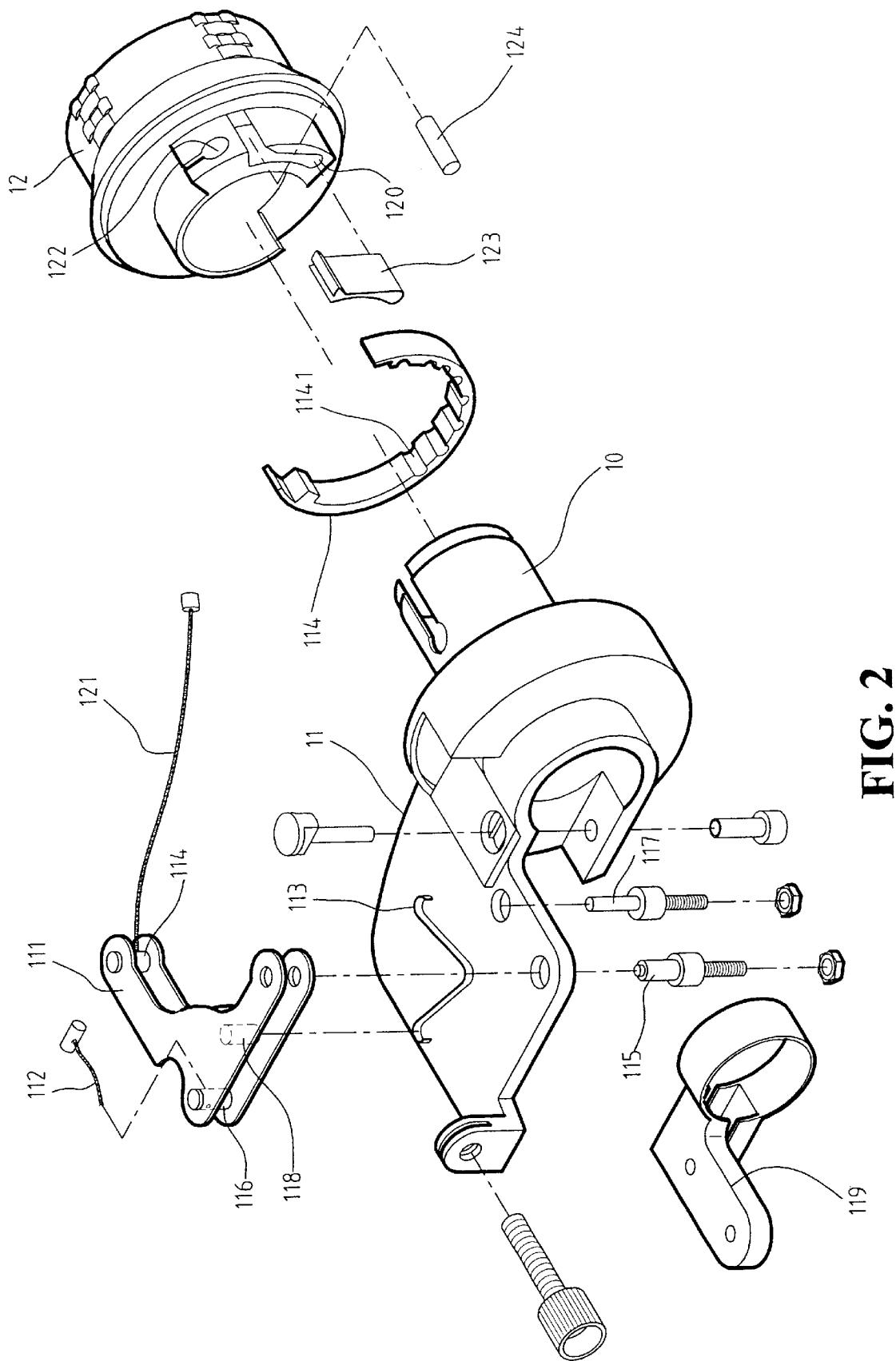
FIG. 2 is an exploded view to show gear shifter on handlebar of the present invention.
Figure 3:
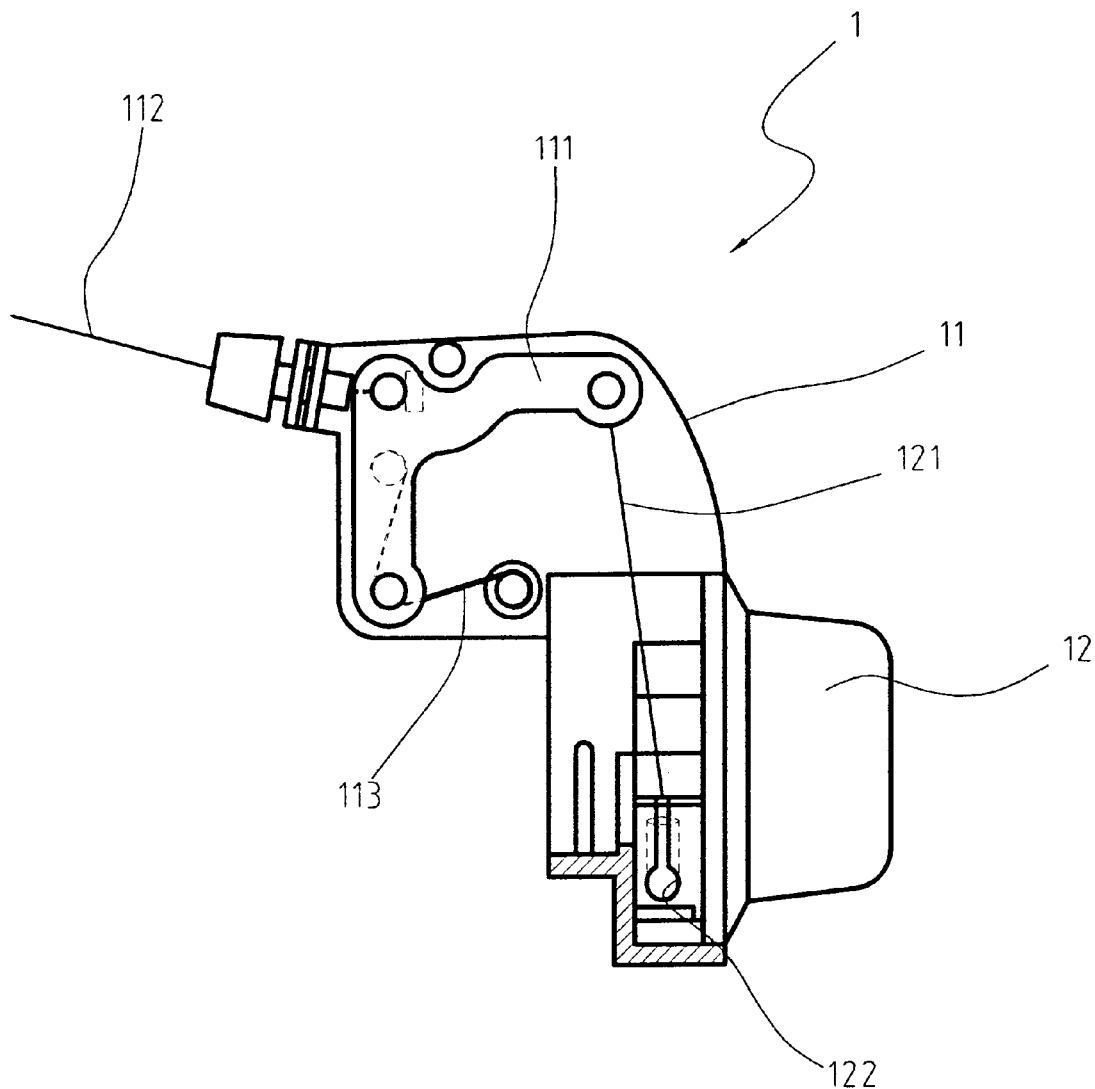
FIG. 3 is a plan view to show the cables on the mediate member in the gear shifter on handlebar of the present invention.
Figure 5:
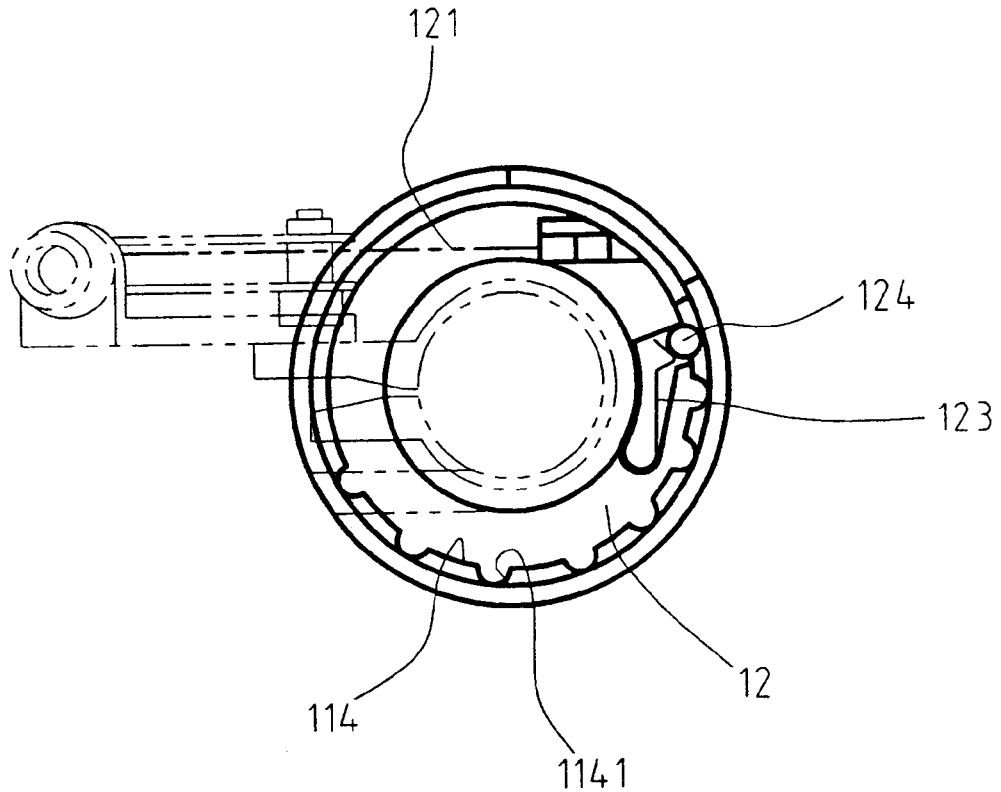
FIG. 5 is an end view to show the index member is received in a notch in the gear shifter on handlebar of the present invention.

Referring to FIGS. 1 to 3, the gear shifter 1 of the present invention comprises a tubular handlebar 10 having a support plate 11 extending from an end of the handlebar 10 and a sleeve 12 is rotatably mounted to the handlebar 10. A clamp member 119 is used to secure the gear shifter 1 from dropping from the handle bar 10. A recess 122 and a chamber 120 are defined in an end of the sleeve 12. Further referring to FIG. 5, a C-shaped member 114 has notches 1141 defined in an inside thereof and is connected to the handlebar 10. A spring member 123 is engaged with the chamber 120 of the sleeve 12 and an index member 124 is biased by the spring member 123. The the index member 124 is removably engaged with one of the notches 1141 when rotating the sleeve 12.

An L-shaped mediate member 111 having an end pivotally connected on the support plate 11. A first cable 121 has one end thereof engaged with the recess 122 and the other end of the first cable 121 is engaged with the mediate member 111. A second cable 112 has an end thereof connected to the mediate member 111 and the other end of the second cable 121 is connected to a derailleur mechanism of a bicycle(both not shown). The mediate member 111 is composed of two identical plates which are connected with each other by three rods connected between the two identical plates. A first rod 114 is connected between two respective first distal ends of the two identical plates, and the first cable 121 is connected to the first rod 114. A second rod 115 is connected between two respective second distal ends of the two identical plates, and the mediate member is pivoted about the second rod 115. A third rod 116 is connected between two respective angled ends of the two identical plates, and the second cable 112 is connected to the third rod 116.

The mediate member 111 has a fourth rod 118 extending from a surface thereof and a V-shaped spring 113 has a mediate portion thereof engaged with the second rod 115. One end of the V-shaped spring 113 is engaged with the fourth rod 118 and the other end of the V-shaped spring 113 is engaged with a fifth rod 117 extending from the support plate 11. By the V-shaped spring 113, the mediate member 111 is maintained at the position as shown in FIG. 3.

Figure 4:
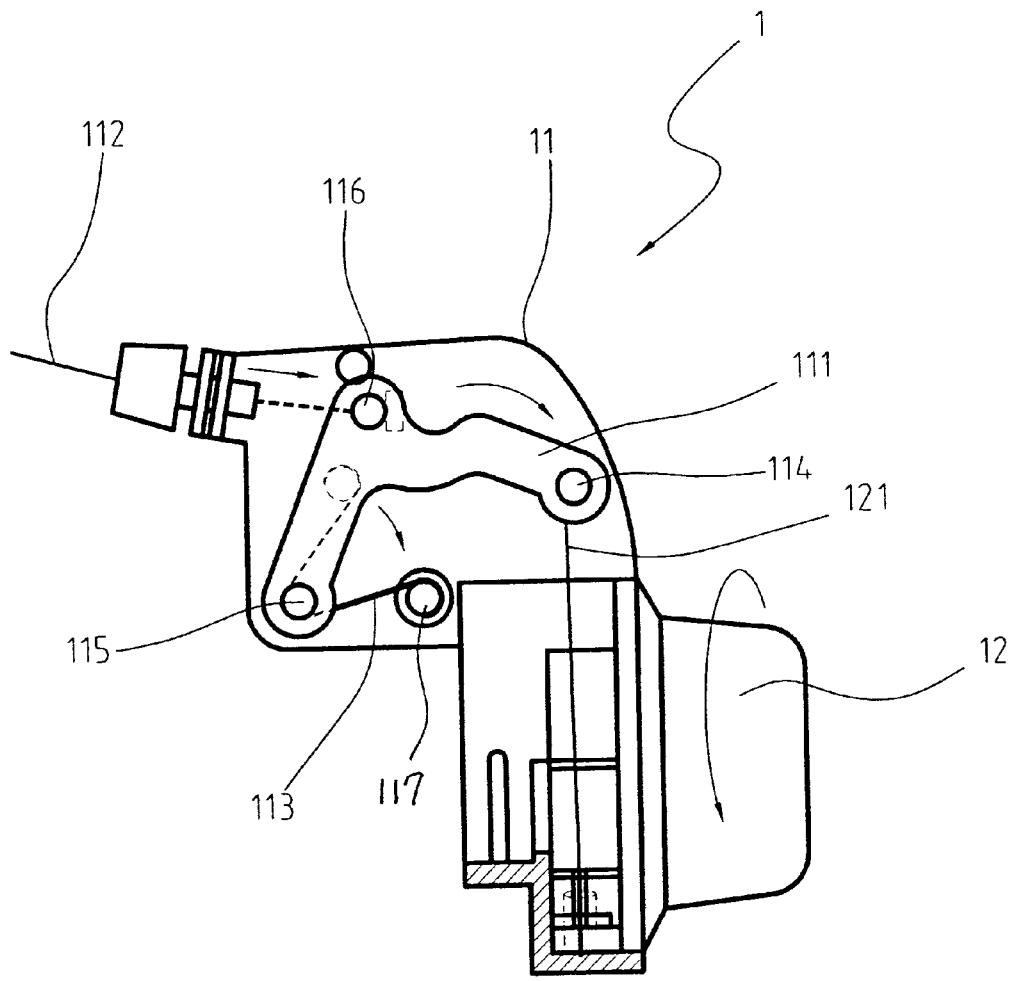
FIG. 4 is a plan view to show the cables on the mediate member are pulled when the gear shifter on handlebar of the present invention is rotated.
Figure 6:
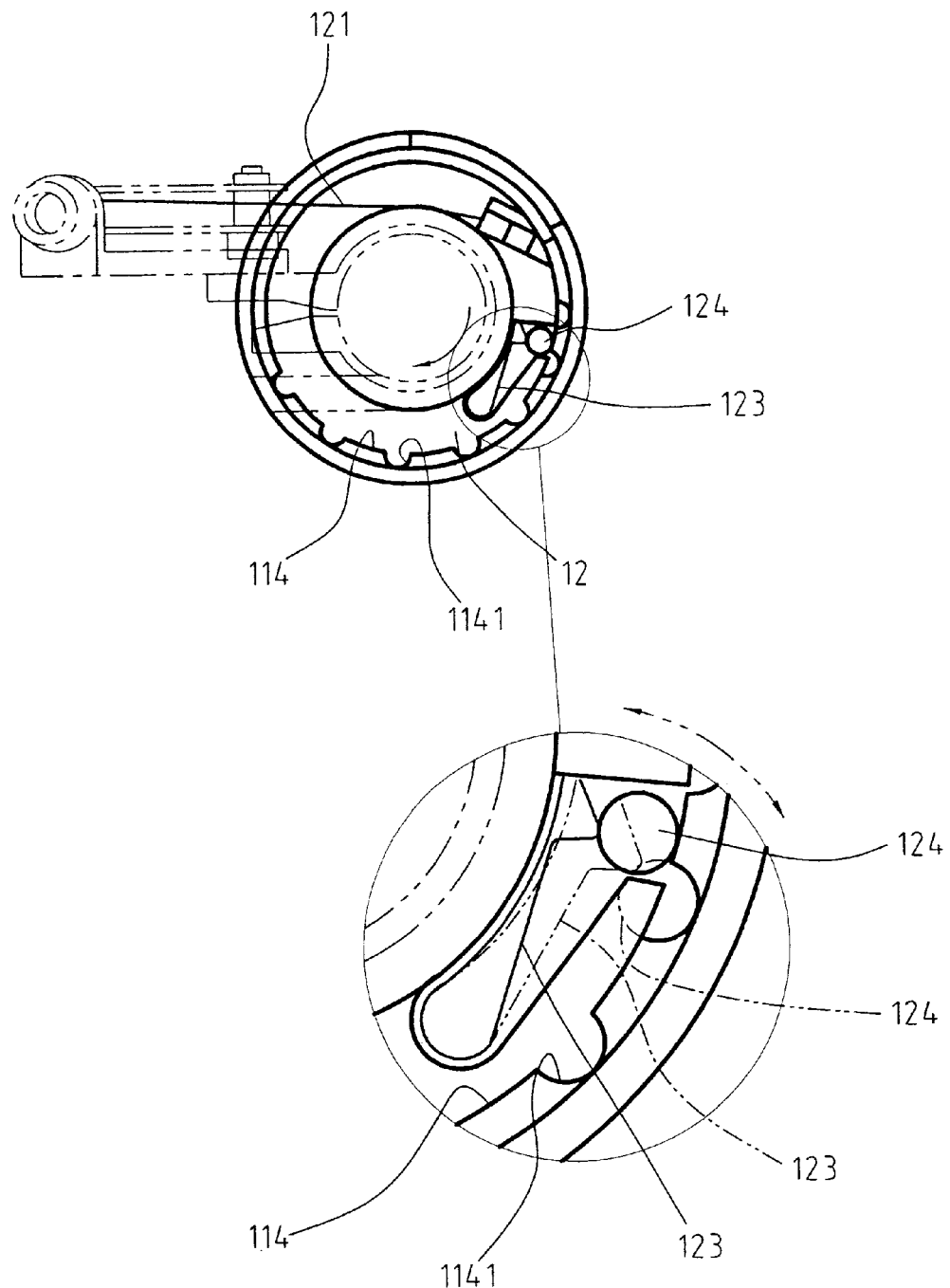
FIG. 6 shows that the index member is removed from one of the notches when the gear shifter on handlebar of the present invention is rotated.

Referring to FIGS. 4 and 6, when rotating the sleeve 12, the mediate member 111 is pivoted and the first cable 121 and the second cable 112 are both pulled, wherein the second cable 112 is pulled to activate the derailleur mechanism. The index member 124 is biased by the spring member 123 and is removed from one notch 1141 to the other. By the index member 124, the user clearly acknowledges the gear is changed.

While we have shown and described the embodiment in accordance with the present invention, it should be clear to those skilled in the art that further embodiments may be made without departing from the scope of the present invention.

What is claimed is:

1. A handlebar gear shifter comprising:
    a tubular handlebar having a support plate extending from an end of said handlebar;

a sleeve rotatably mounted to said handlebar and a recess defined in an end of said sleeve, a mediate member having an end pivotally connected on said support plate, a first cable having one end thereof engaged with said recess and the other end of said first cable engaged with said mediate member, a second cable having an end thereof connected to said mediate member and the other end of said second cable adapted to be connected to a derailleur mechanism, and a C-shaped member having notches defined in a side thereof and connected to said end of said sleeve, a spring member engaged with said sleeve and an index member biased by said spring member, said index member removably engaged with one of said notches.

2. The gear shifter as claimed in claim 1, wherein said mediate member is an L-shaped member and composed of two identical plates which are connected with each other by three rods connected between said two identical plates, a first rod connected between two respective first distal ends of said two identical plates, a second rod connected between two respective second distal ends of said two identical plates, a third rod connected between two respective angled ends of said two identical plates, said mediate member being pivoted about said second rod.

3. The gear shifter as claimed in claim 2, wherein said first cable is connected to said first rod and said second cable is connected to said third rod.

4. The gear shifter as claimed in claim 2, wherein said mediate member has a fourth rod extending from a surface thereof and a V-shaped spring has a mediate portion thereof engaged with said second rod, one end of said V-shaped spring engaged with said fourth rod and the other end of said V-shaped spring engaged with a fifth rod extending from said support plate.

* * * * *